G. M. WILLIS AND L. V. NEWTON.
MOUNTING FOR TANKS AND THE LIKE.
APPLICATION FILED APR. 6, 1920.
1,374,972.
Patented Apr. 19, 1921.
3 SHEETS—SHEET 2.
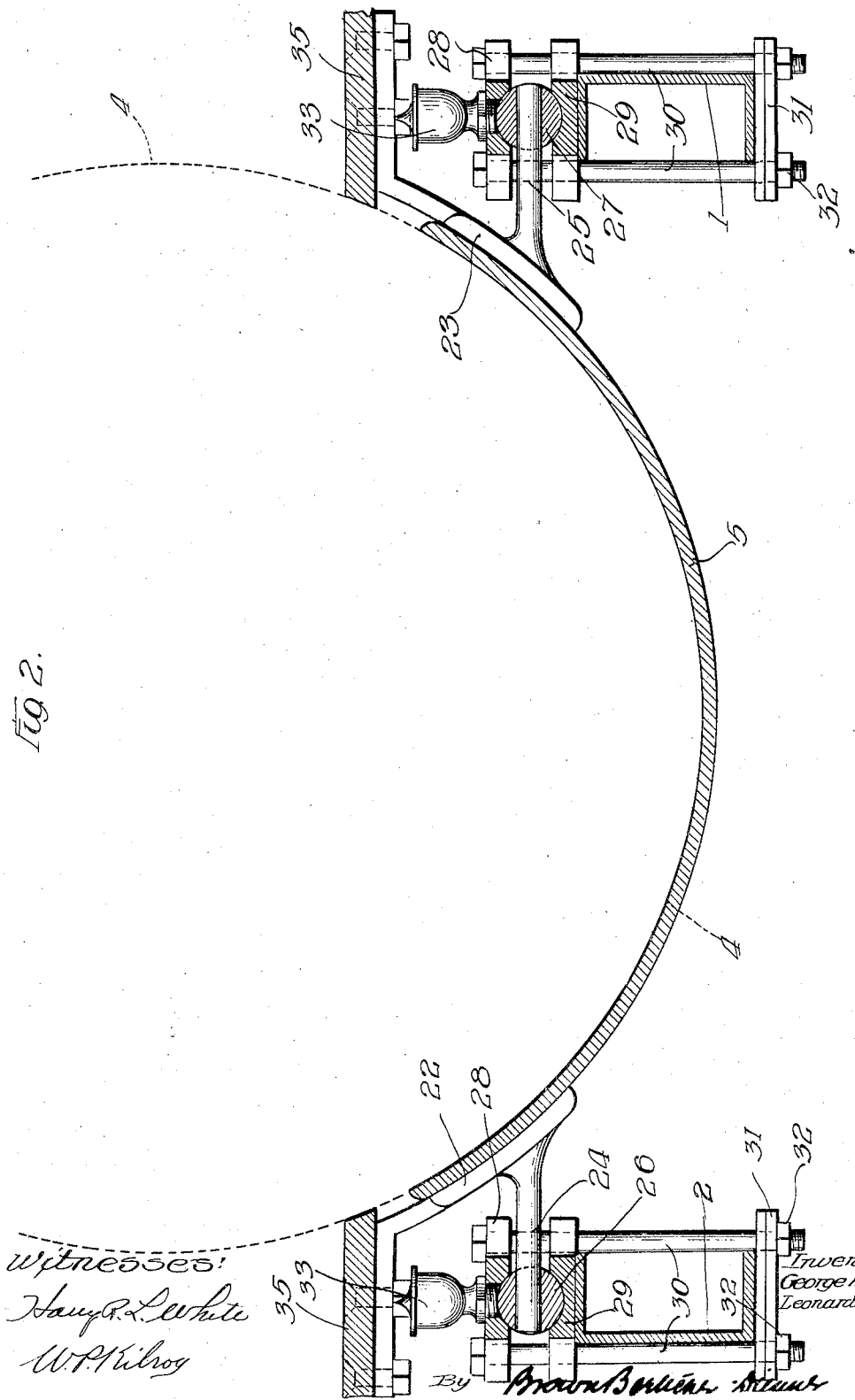

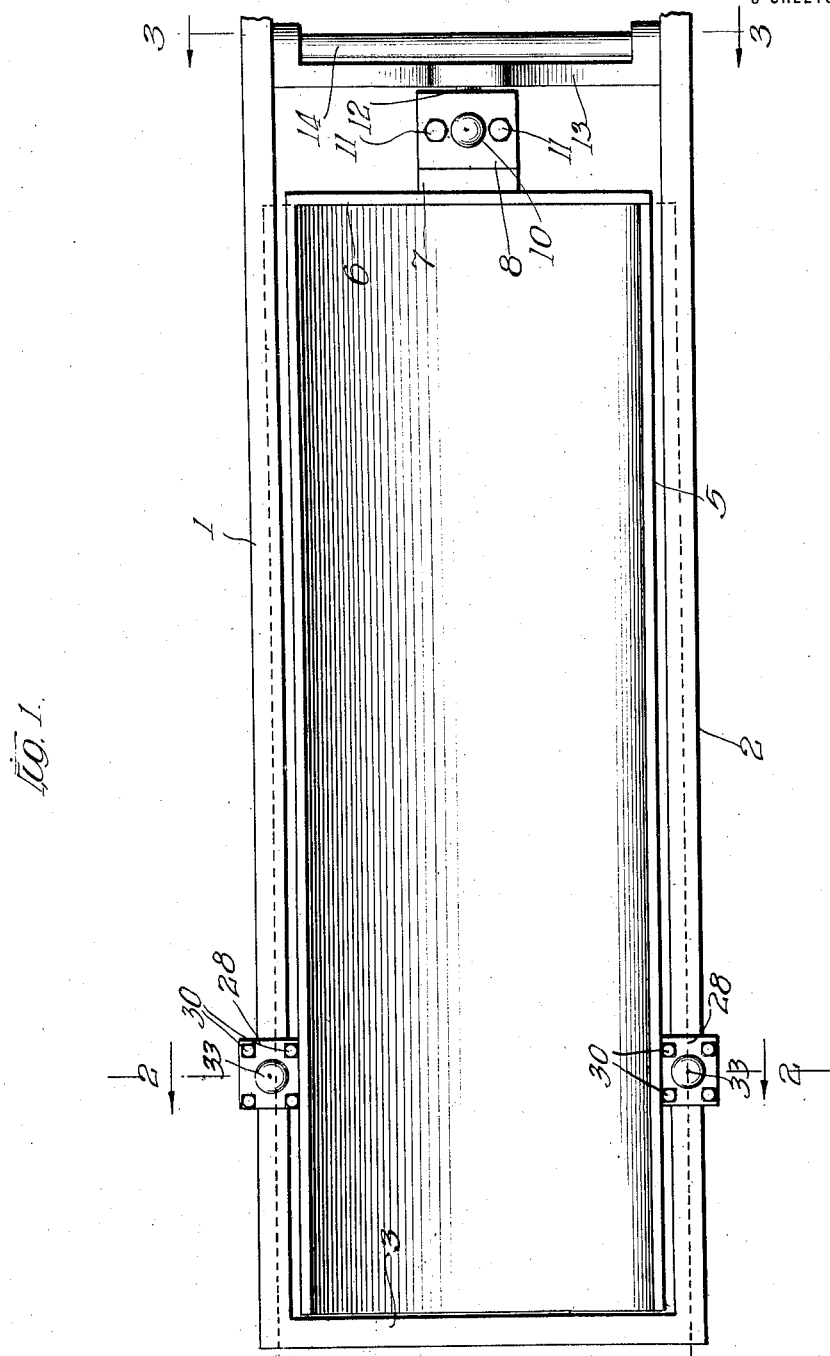

G. M. WILLIS AND L. V. NEWTON.
MOUNTING FOR TANKS AND THE LIKE.
APPLICATION FILED APR. 6, 1920.
1,374,972.
Patented Apr. 19, 1921.
3 SHEETS—SHEET 3.
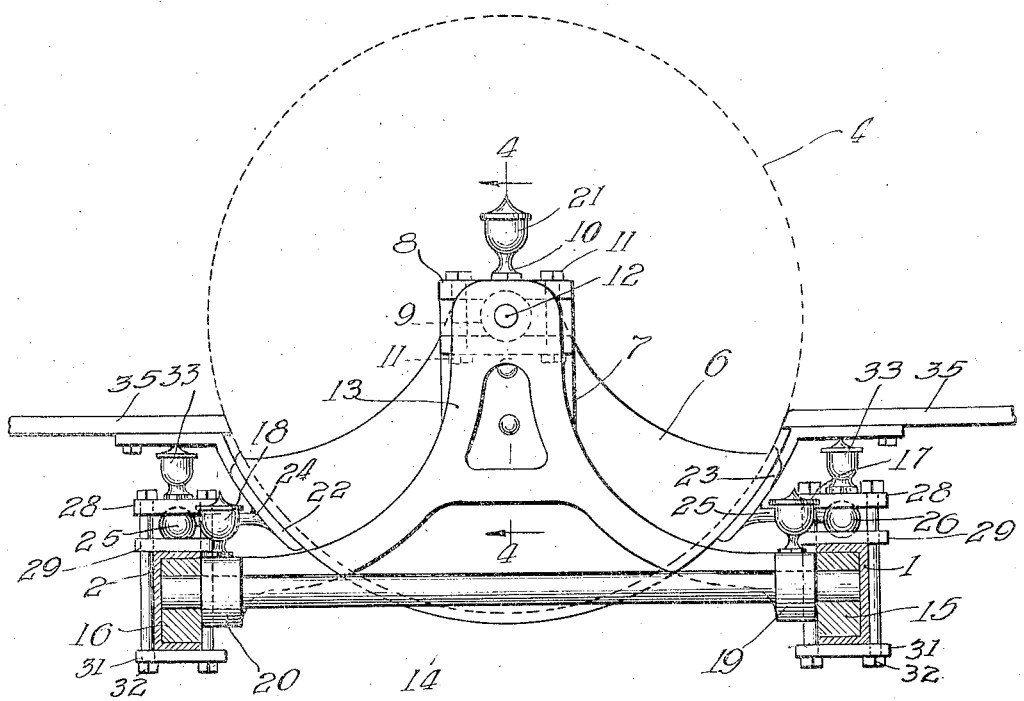
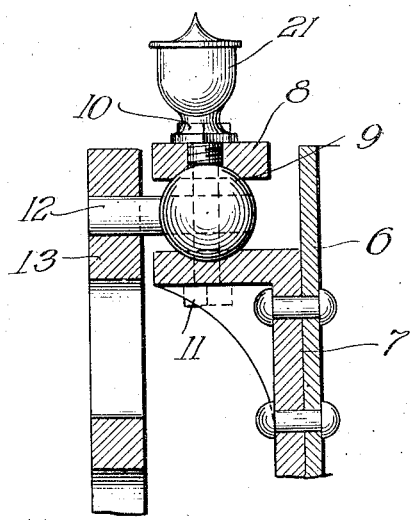
Witnesses:
Harry R. White.
W. F. Kilroy
Inventors.
George M. Willis
Leonard V. Newton,
By Brown Boettcher & Dienner
Attys.

UNITED STATES PATENT OFFICE.

GEORGE M. WILLIS, OF CHICAGO, ILLINOIS, AND LEONARD V. NEWTON, OF NEW YORK, N. Y., ASSIGNORS TO GEORGE M. WILLIS, OF CHICAGO, ILLINOIS.

MOUNTING FOR TANKS AND THE LIKE.

1,374,972.  Specification of Letters Patent.  Patented Apr. 19, 1921.

Application filed April 6, 1920. Serial No. 371,656.

*To all whom it may concern:*

Be it known that we, GEORGE M. WILLIS and LEONARD V. NEWTON, citizens of the United States, residing at Chicago, in the county of Cook and State of Illinois, and New York, in the county of New York and State of New York, respectively, have invented a certain new and useful Improvement in Mountings for Tanks and the like, of which the following is a full, clear, concise, and exact description, reference being had to the accompanying drawings, forming a part of this specification.

Our invention relates to an improved mounting for tanks and the like; tanks of the type employed in connection with the so-called "tank-trucks" or "tank-cars" for the transportation of liquid or any other tank analogous member between which and its supporting member distortion, disalinement or relative movement is apt to take place.

Taking the "tank truck" for example, it is well known that in such a truck the distortion and weaving to which the chassis of all trucks are subjected is relatively great by reason of the relatively great liquid load which is transmitted to the chassis. Furthermore, such a load shifts considerably upon riding over inequalities in the road and inclined surfaces and consequently the distortion and weaving of the chassis is thereby still further increased by reason of the varying stresses to which the same is subjected. In trucks of this type great difficulty has been experienced in securing a proper mounting of the tank. Spring mountings of the tank have been found impractical in that the springs quickly assume a permanent set, whereupon a substantially rigid mounting of the tank is effected. Fluid cushion mountings, irrespective of their relatively great cost of installation and maintenance, have been found impractical.

The accepted mounting of the prior art, not by reason of its adaptability to the situation, but because nothing better adapted has been provided comprises a plurality of bolsters arranged across and fixed at their opposite ends to the longitudinal sills or side rails of the vehicle frame to provide a cradle in which the tank is then strapped or otherwise secured. The disadvantages of a mounting of this type are well known. Distortion, disalinement or weaving in the chassis or in the tank supporting members carried thereby necessitates relative movement between the chassis or supporting members and the tank and the lack of any provision for such movement finally results in cracking or rupture of the tank or in opening of the joints between the tank section in the event a sectionalized tank is employed. The attempts of the prior art to avoid these difficulties by increasing the thickness of the walls of the tank have not been successful in spite of the increased expense and the increased weight to be carried. Cracking or rupture of the walls of such a tank renders the same worthless in so far as further service is concerned, and a new tank means considerable expenditure in addition to the fact that the truck is disabled until the proper replacement has been made. Baffle walls are frequently arranged within such tanks and the connection of such baffle walls with the walls of the tank have been either opened or the walls cracked, ruptured, or twisted out of shape.

We propose to overcome these difficulties of a prior art by the provision of a novel, simple, easily assembled and installed, comparatively inexpensive and highly practical self-adjusting mounting for the tank, whereby distortion, disalinement, weaving or relative movement between the tank and the supporting frame is readily compensated for. In the particular embodiment herein disclosed which we find to be a highly successful mode of applying the principle with which our invention is broadly concerned, the aforesaid compensation is made through coöperating bearing members having complementary internal and external spherical surfaces, any relative movement between the tank and the supporting frame being accompanied by a corresponding movement between these complementary surfaces so that the load will under all conditions be properly distributed over the supporting members and the accompanying stresses to which such tanks have heretofore been subjected are avoided.

A further feature of the present invention is the provision for lowering the center of gravity of the tank to a greater extent than heretofore possible, whereby the stability of the entire truck is increased. The particular means and arrangement which we have shown is not the only means and arrangement which may be employed within the scope of our invention, but is the preferred means and arrangement which we find simple and inexpensive, reliable and highly practical.

In order that those skilled in the art may be fully acquainted with the nature and scope of our invention we shall describe the specific embodiment shown in the accompanying drawings, which drawings form a part of the present specification.

In the drawings:

Figure 1 is a plan view of a tank and supporting frame therefor, showing the tank mounted thereupon in accordance with the teachings of our invention;

Fig. 2 is a transverse sectional view through the longitudinal sill members of the supporting frame and supporting bearings associated therewith taken substantially on the line 2—2 of Fig. 1;

Fig. 3 is a transverse sectional view taken substantially on the line 3—3 of Fig. 1, and Fig. 4 is a vertical sectional view taken substantially on the line 4—4 of Fig. 3.

As hereinbefore set forth the present invention has been provided primarily as a mounting for tanks of the type employed in connection with the so-called "tank trucks," etc. The applicability of the invention is not, however, limited to such use or purpose only. Therefore, the invention is not concerned with the details of construction of the tank or the supporting frame. The particular details of construction and arrangement of the mounting with the principle of which our invention is broadly concerned will vary with the various types of tanks, and so forth, and supporting members.

The supporting frame shown includes the usual longitudinal sill members 1 and 2, such as are common in the various truck chassis or frames now in use, having the usual cross girths 3 arranged therebetween. Heretofore, as has been pointed out, it has been customary to mount and securely strap the tank 4 in a plurality of bolsters arranged across and fixed at their opposite ends to the longitudinal sills or side rails 1 and 2. The essential disadvantages of such a mounting have been set out. In addition, in such an arrangement, the bottom of the tank being necessarily above the upper base of the supporting frame has positioned the center of gravity of the tank at a considerable height.

According to our invention the tank 4 is preferably mounted in a supporting cradle 5 which supporting cradle is mounted on the truck frame or chassis preferably through a three point suspension as clearly shown in Fig. 1. The supporting cradle 5 which may be cast or otherwise fashioned, preferably of metal, is open at its rear end and provided with a forward end wall 6 which end wall 6 sweeps up toward the axis of the tank 4 and carries a bearing bracket 7 riveted or otherwise suitably fixed thereto. The horizontally extending portion of the bracket 7 and a coöperating cap member 8 are provided with supplemental internal spherical surfaces between which a bearing member 9 having a complementary external spherical surface is mounted and properly clamped against displacement by means of suitable threaded studs or bolts 10, the free ends of which engage in the coöperating nuts 11.

This forward end of the cradle 5 is suspended from a short shaft 12 carried by a substantially upright bearing bracket 13. The shaft 12 projects from the bracket 13 into a coöperating bore provided therefor in the bearing member 9. The downwardly sweeping arms of the bracket member 13 are sleeved and the bracket member thereby rotatably mounted upon a shaft 14 arranged transversely between the longitudinal sills 1 and 2 of the frame and mounted at its opposite ends in suitable filler blocks 15 and 16 arranged in the internal channels of the sill members 1 and 2 respectively. Suitable oil cups 17 and 18 mounted in the diverging arms respectively of the bracket member 13 insure proper lubrication of the bearing surfaces 19 and 20 at all times while an oil cup 21 mounted in the cap member 8 insures proper lubrication of the complementary bearing surfaces of the bearing member 9, bearing bracket 7 and cap member 8, respectively.

The opposite sides of the cradle member 5 are mounted within their length in a manner which will now be described. In this particular instance a pair of bearing brackets 22 and 23 are riveted or otherwise suitably mounted adjacent the opposite edges respectively of the cradle member or cross sides. These bearing brackets are provided with protruding studs 24 and 25 which studs project into coöperating bores provided therefor in the bearing members 26 and 27 respectively. The substantially spherical bearing members 26 and 27 are mounted between a pair of bearing plates 28 and 29 having coöperating internal spherical surfaces and properly clamped against displacement by means of suitable threaded studs or bolts 30. In addition to clamping the bearing plates 28 and 29 properly together these studs or bolts 30 extend down through a plate 31 arranged beneath the sill member 1 or 2, as the case may be, and engage at their free ends in nuts 32, thereby mounting the entire bearing in place upon the supporting frame. Of course the plate 28 could be otherwise fixed upon the sill members 1 and 2 and the plates 29 clamped thereto, if so desired. Suitable oil cups 33 mounted in the bearing plates 28 insure proper lubrication of the coöperating bearing surfaces of the bearing members 26 and 27 and plates 28 and 29, respectively.

It will now be apparent that upon any tendency toward distortion, disalinement, weaving or relative movement between either or both of the longitudinal sill members 1 and 2, and the tank 4 will be readily compensated for by movement of the bearing plates 28 and 29 about their coöperating bearing members 26 and 27 as the case may be, providing in effect, a universal connection between the cradle 5 and the sill members 1 and 2, respectively. These universal connections permit distortion, disalinement, weaving or movement of either or both of the sill members 1 and 2 without subjecting the tank 4 to the stresses to which such a tank has heretofore been subjected. In fact the tank 4 is entirely relieved of such stresses and the thickness of its walls can consequently be decreased considerably. In a like manner, a universal connection is effected between the opposite end of the cradle 5 and the bearing brackets 13 for compensating for relative movement between the supporting frame and the tank, either transverse, longitudinal or any other relative movement. Considerable longitudinal distortion or weaving of the frame is further compensated for by rotation of the bearing bracket 13 about the transverse shaft 14.

The tank 4 may be mounted in the cradle 5 in any desired manner although we prefer to strap the same therein through the usual straps arranged circumferentially thereabout and attached at their opposite ends with the cradle member or trough. Suitable shelves 35, although immaterial in so far as our invention is concerned, may be provided longitudinally along the opposite sides of the tank 4 if so desired for carrying the usual oil cans, and so forth, that accompanies such a tank. In dropping the bottom of the tank between the longitudinal sill members 1 and 2, we have lowered the center of gravity thereof and thereby increased the stability of the truck.

While we have disclosed our invention in connection with the details of a particular embodiment, we do not intend thereby to limit the invention to such details as we are aware and contemplate that various changes and arrangements may be made without departing from the spirit and scope of the invention as set out in the appended claims. For example, the cradle 5 could be dispensed with and the various bearing brackets attached directly to the tank 4 or the particular arrangement of the bearings could be reversed, i. e., the spherical portions carried by the supporting frame, and the confining or race portions carried by the tank. We have therefore drawn the appended claims accordingly.

We claim:

1. In combination, a supporting frame including a pair of longitudinal frame members, a tank carried by the frame, a bracket member mounted to swing longitudinally about an axis extending transversely between the longitudinal frame members of the supporting frame, the mounting of the tank upon the frame including a universal supporting connection between one end of the tank and said longitudinally swinging bracket member, said universal supporting connection together with the longitudinal swinging of said bracket about the transversely extending axis carrying the same compensating for relatively great distortion, disalinement and weaving between said frame and said tank, and permitting variation in the position of the supporting connection with the frame.

2. In combination, a supporting frame including a pair of longitudinal frame members, a shaft extending transversely between and journaled at its opposite ends in said longitudinal frame members, a bracket member mounted upon said transversely extending shaft to swing longitudinally about the axis thereof, a tank, a carrying cradle for said tank, coöperating universal mounting bearings between one side of said cradle and one of the longitudinal frame members, coöperating universal mounting bearings between the other side of said cradle and the other of said longitudinal frame members, and a universal supporting connection between one end of said cradle and the longitudinally swinging bracket member, the longitudinal swinging of said bracket member relative the supporting frame together with the universal supporting connection between the frame and bracket member and the carrying cradle compensating for relatively great distortion, disalinement and weaving between said frame and the tank.

3. In combination, a supporting frame including a pair of longitudinal frame members, a tank carried by said supporting frame, a bracket member mounted to swing longitudinally about an axis extending transversely between the longitudinal frame members of said supporting frame, the mounting of said tank including a pair of universal supporting connections directly with the supporting frame, and a third universal supporting connection with said longitudinally swingable bracket member, longitudinal swinging of said bracket member relative the supporting frame together with the universal supporting connection between the tank and said supporting frame and the tank and said bracket member compensating for distortion, disalinement and weaving between the tank and the supporting frame.

In witness whereof we hereunto subscribe our names this 27th day of March, A. D. 1920.

GEORGE M. WILLIS.
LEONARD V. NEWTON.